R. M. BEARD.

ELECTRIC LIGHT FIXTURE.

APPLICATION FILED SEPT. 12, 1919.

Reissued Dec. 30, 1919. 14,781.

WITNESS:
Geo. E. Cheney

INVENTOR.
Richard M. Beard
BY
Rosenbaum, Stockbridge & Borck
ATTORNEYS.

UNITED STATES PATENT OFFICE.

RICHARD M. BEARD, OF NEW YORK, N. Y.

ELECTRIC-LIGHT FIXTURE.

14,781. Specification of Reissued Letters Patent. Reissued Dec. 30, 1919.

Original No. 1,243,481, dated October 16, 1917, Serial No. 107,043, filed July 1, 1916. Application for reissue filed September 12, 1919. Serial No. 323,414.

*To all whom it may concern:*

Be it known that I, RICHARD M. BEARD, a citizen of the United States, residing at the city of New York, in the borough of Manhattan and State of New York, have invented certain new and useful Improvements in Electric-Light Fixtures, of which the following is a full, clear, and exact description.

This invention relates to electric lighting fixtures of the indirect or semi-indirect type.

One of the objects of the invention is to provide a lighting fixture of this character which is of a simple construction and is adapted to be supported by a lamp socket which depends from the ceiling or other suitable structure. Another object of the invention is to provide a fixture in which the reflector may be temporarily supported in place while the lamp socket and other portions of the fixture are being secured in position, whereby the entire fixture may be readily assembled and placed in position by one man.

Other objects of the invention will be apparent from the detailed description hereinafter to follow, and will be particularly pointed out in the appended claims.

Figure 1:
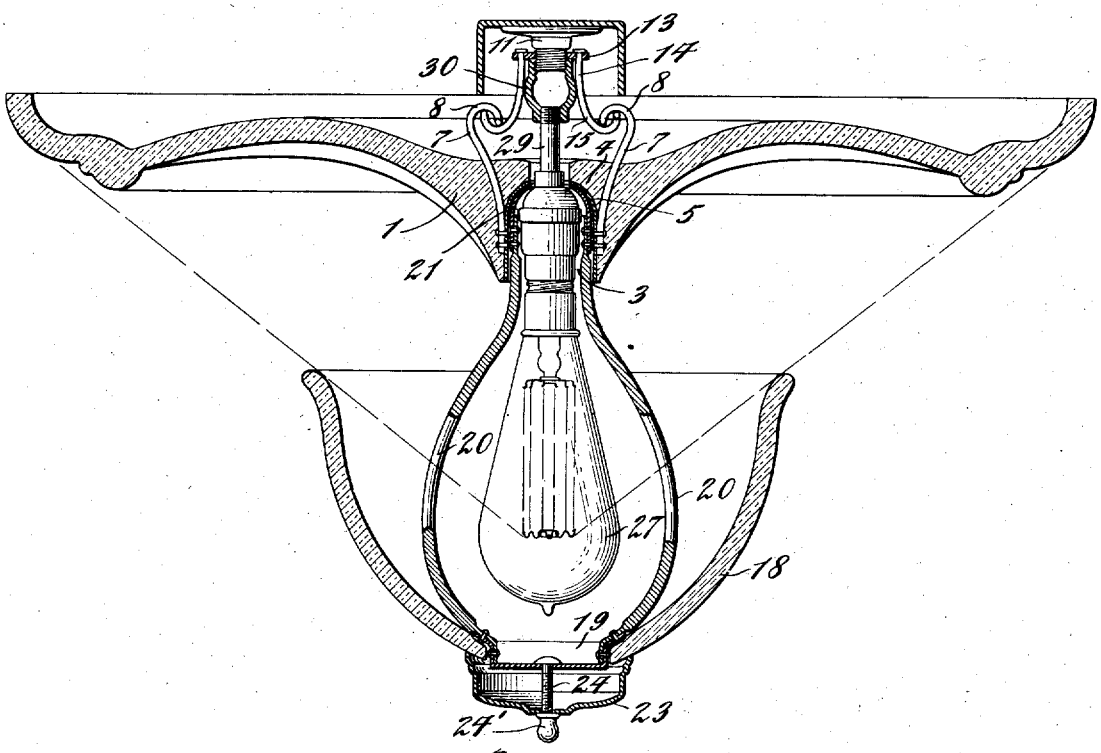
Figure 2:
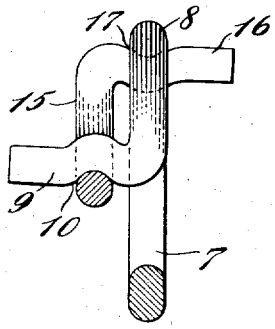

In the drawings, Figure 1 is a central vertical section of a lighting fixture constructed in accordance with the principles of the invention; and Fig. 2 is a detail of the means utilized to temporarily support the reflector in position.

The lighting fixture shown, as is usual with fixtures of this type, comprises a ceiling reflector 1 which is circular in shape and preferably slightly cone-shaped so as to spread the rays reflected from its surface. The reflector may be constructed from any suitable material, a composition having plaster of Paris as a base, being ordinarily employed. The reflector can then be cast in molds and given any desired curvature and surface ornamentation, as in the ceiling reflector shown, the reflecting face is fluted. The reflector is provided with a central opening 3, which is of a reduced diameter at its upper end, providing a curved annular shoulder 4. Fitting within this opening and abutting against the shoulder 4 is a cup-shaped shell 5 having a central opening therein alining with the opening of reduced size in the reflector. A plurality of resilient hooks 7 are riveted to the shell 5 at their lower ends and project from the rear face of the reflector and are curved at the upper ends to provide hooked portions 8. The end 9 of each hooked portion is bent laterally, as shown in Fig. 2, and is bent adjacent its point of jointure with the hooked portion 8 to provide a seat 10. As is obvious the reflector is cast around the shell 5 and hooks 7 which will rigidly secure these parts to the reflector.

Positioned directly over the central opening in the reflector, and disposed within a suitable recess within the ceiling, is an outlet box in which is mounted a fixture stud 11. This stud is threaded at its lower end and carries a bar or cross head 13 which is threaded upon the same. Passing through suitable openings in the outer ends of this bar are resilient hooks 14, similar in construction to the resilient hooks 7, having hooked portions 15 provided with lateral offset ends 16, which are also provided with seats 17 adjacent their points of connections with the hooked portions 15. These resilient hooks serve as the means for temporarily supporting the reflector in position until the other parts of the structure are assembled, and it will be seen from Fig. 2 that in order to place the reflector in position it is necessary to bring the respective resilient hooks 7 and 14 into proximity, and then slightly rotate the reflector when the ends 16 of the hooked portions 15 will engage beneath the hooked portions 8 of the resilient hooks 7, and in the same manner the offset ends 9 of the hooks 7 will engage beneath the hooked portions 15 of the resilient hooks 14. From Fig. 2 it will be seen that the off-set portions 9 and 16, respectively, should be bent just sufficiently to permit the free ends of the offset portions to pass beneath the corresponding hooked portions, and then as the reflector is rotated, the resiliency of the hooks will permit them to yield sufficiently to seat, as described, and the reflector will be held against the ceiling by the resiliency of the hooks.

The other portions of the fixture comprise a shade 18 which may be of translucent glass, where a semi-direct lighting system is desired, or may consist of a bowl of an opaque material, where an indirect system is employed. This bowl or shade is provided with the usual central opening, which is fitted into a flanged disk 19. Secured to this disk are supporting arms or rods 20, which are curved outwardly in their middle portions as shown, to provide sufficient space for the incandescent lamp. These arms are secured at their upper ends to a shell 21, of a similar shape to the shell 5, but of a slightly smaller size so that it will snugly fit within the same. This shell is also provided with a central opening. The shade is supported by a hollow metallic cap 23 which is secured to the disk 19 by means of a threaded bolt or stud 24, which passes through the flanged disk and cap and has a thumb knob 24' threaded upon its lower end which draws the disk and cap together.

An incandescent lamp is shown and designated 27, which lamp is mounted in the usual lamp socket 28 which is rigidly supported by a threaded pipe or nipple 29, one end of which is threaded into the upper end of the lamp socket, as is the usual construction, while the other end of the nipple is supported from the fixture stud 11 by means of an open union or hicky 30, through which leading-in wires pass for connection to the socket. When the lamp socket is rigidly supported as described, the curved annular shoulder upon the shell 21 rests upon the lamp socket and will support the arms 20 and the other portions of the shade-holding means. The lamp socket also rigidly supports the ceiling reflector in position, since it will bind the curved annular shoulder on the shell 21 against the shoulder upon the shell 5 secured in the central opening in the reflector. When, therefore, the lamp socket is secured tightly into place the ceiling reflector 9 will be held against the ceiling and rigidly positioned, after which time the temporary supporting means comprising the resilient hooks 7 and 14 are no longer necessary to support the reflector, but remain in position to serve as a support in dismantling the fixture.

In assembling the fixture, the ceiling reflector is first temporarily supported by means of the hooks 7 and 14 by slightly rotating the reflector to bring the offset portions of the hooks into locking engagement with each other, the resilient hooks holding the reflector rigidly against the ceiling. The shell 21 is then fitted within the central opening in the ceiling reflector and the lamp socket 28 secured in place, which may be readily accomplished by a single workman as the ceiling reflector supports itself during this operation.

It will be noted that in the assembled fixture, the hooks which support the reflector are entirely concealed and hence do not detract from the ornamental appearance of the fixture. This feature of construction is accomplished by making the reflector slightly cone-shaped as described which raises the peripheral edge of the rear face and provides a recess or chamber in which the hooks are located. It will also be noted that the hooks 14 which depend from the ceiling are carried by the stud 11 so that the supporting hooks may be used without change with any of the existing type of outlet boxes and without marring the ceiling. It will be further noted that the lamp socket is substantially concealed from view by positioning it within the central opening in the reflector where it cannot detract from the appearance of the fixture nor cause a break in the graceful and ornamental lines thereof.

I claim:

1. In combination, a lamp socket and its support, a reflector comprising a disk of plastic composition having a central opening through which said support passes, a metallic shell lining said opening, a second shell in said opening fitting over said lamp socket and resting against said first named shell, and shade-holding means carried by said second named shell.

2. In an electric lighting fixture, a reflector comprising a disk of plastic composition having a central opening therein, a metallic shell lining said opening, a second shell in said opening upon which said reflector rests, said last named shell being adapted to receive a lamp socket and to be supported thereby, and shade-holding means carried by said second named shell.

3. In an electric lighting fixture, a reflector comprising a disk of plastic composition having a central opening therein, and a metallic shell embedded in said central opening for reinforcing and supporting said reflector, said shell being of a size and shape to receive and substantially conceal the lamp socket.

4. In an electric lighting fixture, a reflector comprising a disk of plastic composition having a central opening therein, and a cup-shaped metallic shell embedded in said central opening, said shell being of a depth and size to receive a lamp socket and to substantially conceal the same.

5. In an electric lighting fixture, a reflector comprising a disk of plastic composition having a central boss, said boss having an opening therethrough, and a cup shaped shell embedded in said opening, said shell being of a depth and size to receive and to substantially conceal a lamp socket.

6. In an electric lighting fixture, a reflector comprising a disk of plastic composition and resilient hooks having laterally bent ends carried by said reflector and ceiling or like structure, respectively, and supporting said reflector in abutting relation to said structure.

7. In an electric lighting fixture, a reflector comprising a disk of plastic composition and having a central opening therein, a shell lining said opening and hooks secured to said shell and projecting from the rear face of said reflector.

8. In an electric lighting fixture, a reflector comprising a disk of plastic composition and having a central opening therein, a shell in said opening, and supporting hooks secured to said shell projecting from the rear face of said reflector, said face having its peripheral edge raised to provide a space for the hooks.

9. In combination, a ceiling outlet box, having a fixture stud mounted therein, hooks carried by said stud, a reflector, and hooks projecting from the rear face of said reflector engaging said first named hooks and holding the reflector against the ceiling, a lamp socket, and a support carried by said fixture stud for supporting said lamp socket.

10. In combination, a ceiling outlet box, having a fixture stud mounted therein, hooks carried by said stud, a reflector, and hooks projecting from the rear face of said reflector engaging said first named hooks and holding the reflector against the ceiling, a lamp socket, and a support carried by said stud for said lamp socket, said reflector resting on said lamp socket and also supported thereby.

11. In an indirect or semi-indirect lighting fixture, the combination of a reflector comprising a disk of plastic composition having a central depending neck portion, a lamp socket disposed within and substantially concealed by the neck portion, and a supporting member for the reflector supported by the lamp socket and having a relatively extensive area of contact with the neck portion, thereby affording a substantially broad support for the reflector at the neck portion.

12. In an indirect or semi-indirect lighting fixture, the combination of a reflector comprising a disk of plastic composition having a central, depending, reinforced neck portion, and a lamp socket disposed within and substantially concealed by the neck portion and serving to support the reflector at the neck portion.

RICHARD M. BEARD.